United States Patent [19]

Sugino

[11] 4,399,052
[45] Aug. 16, 1983

[54] ACTIVATED CARBONACEOUS HONEYCOMB BODY AND PRODUCTION METHOD THEREOF

[75] Inventor: Morihiko Sugino, Kamakura, Japan

[73] Assignee: Kabushiki Kaisha Kobe Seiko Sho, Kobe, Japan

[21] Appl. No.: 302,984

[22] Filed: Sep. 17, 1981

[30] Foreign Application Priority Data

Dec. 22, 1980 [JP] Japan ................... 55-181692

[51] Int. Cl.³ ............... B01J 20/20; C01B 31/10; C01B 31/08; B01J 21/18
[52] U.S. Cl. ........................... 252/421; 252/422; 252/444; 264/29.1; 264/29.7; 423/445
[58] Field of Search .......... 252/421, 422, 444, 445; 423/445, 449; 264/29.1, 29.3, 29.6, 29.7; 428/116

[56] References Cited

U.S. PATENT DOCUMENTS

| | | | |
|---|---|---|---|
| 3,825,460 | 7/1974 | Yoshikawa et al. | 252/421 |
| 3,859,421 | 1/1975 | Hucke et al. | 264/429.1 |
| 3,891,574 | 6/1975 | Kobayashi et al. | 252/421 |
| 4,225,569 | 9/1980 | Matsui et al. | 423/449 |

Primary Examiner—P. E. Konopka
Attorney, Agent, or Firm—Oblon, Fisher, Spivak, McClelland & Maier

[57] ABSTRACT

An activated carbonaceous honeycomb body is prepared by extruding a tempered mass containing a thermosetting resin such as phenol resin, drying and solidifying the green honeycomb body, preheating the same in a nonoxidizing atmosphere at a heating rate of 30° C./hr or lower to a temperature between 500° and 1,100° C. until the hydrogen content of the resulting C-matrix has been lowered to 2% or less, and then heating the thus-preheated honeycomb body in an activating atmosphere to a temperature between 600° and 1,000° C. until the ratio of the total thickness of resulting activated carbon layers to that of the remaining glassy carbon layer in the thickness direction of each wall of the honeycomb body has reached a value not greater than 30. The activated carbonaceous honeycomb body exhibits good refractoriness and thermal shock proofness as well as pertains excellent strength, particularly, against compression forces. Accordingly, it can be effectively used as a catalyst support, adsorbent or filter.

6 Claims, 2 Drawing Figures

ACTIVATED CARBONACEOUS HONEYCOMB BODY AND PRODUCTION METHOD THEREOF

BACKGROUND OF THE INVENTION

1. Field of the Invention

This invention relates to an activated carbonaceous honeycomb body obtained by forming through extrusion a mixed and kneaded mass containing a thermosetting resin and, as a binder, a water-soluble thermosetting resin into a honeycomb structure and then carbonizing and activating the same. It also relates to a production method of the activated carbonaceous honeycomb body.

2. Description of the Prior Art

New application fields have been rapidly developed in recent years for inorganic porous materials, resulting in a wide-spread use of the materials centered in the fields of filters, adsorbents, acoustical materials, heat insulaters, catalyst carriers and supports, etc. In the course of study and/or research work on the application of inorganic porous materials in such an extensive fields, many problems or inconvenience were encountered, regarding their handling and processing convenience and their effectiveness, in attempts of using them in their original shapes as raw materials. Thus, there is a tendency that such inorganic porous materials are shaped in pellets, beads, rings, and honeycombs for applications. Most suitable shape is selected depending on each application. Honeycomb shapes are favorably used where such inorganic porous materials are not supposed to cause any substantial pressure loss, for example, in the field of catalyst supports employed for the reaction of gaseous substances.

As raw materials for honeycomb bodies, there have been extensively used inorganic materials such as cordierite, mullite, alumina and the like. For example, U.S. Pat. Nos. 3,790,654 issued Feb. 5, 1974 to Rodney D. Bagley and assigned to Corning Glass Work, 3,824,196 issued July 16, 1974 to John Jones Benbow and Leslie Waddington Lord and assigned to Imperial Chemical Industries Limited, and 3,885,977 issued May 27, 1975 to Irwin M. Lachman and Ronald M. Lewis and assigned to Corning Glass Work disclose, each, a honeycomb ceramic body produced by mixed and kneading an inorganic material such as kaolin, clay, talc, alumina or the like with an organic binder, forming through extrusion the thus mixed and kneaded mass into a honeycomb structure, and then subjecting the same to drying and firing. However, such a ceramic body using such an inorganic material as its raw material has been found unsuitable for use in any field where excellent resistance to reduction and thermal impact is required. Namely, if employed for the treatment of a gas containing a reducing gas, the above-described inorganic materials are liable to reduction by the reducing gas and the life of such a honeycomb body is badly shortened. With the foregoing in view, honeycomb bodies of a carbonaceous material such as activated carbon have recently been attracting attention for use in such an application field. Such carbonaceous honeycomb bodies are disclosed, as far as the present inventors are aware of, in Japanese patent laid-open Nos. 609/1973 laid open on Jan. 8, 1973 and naming as inventors Takayuki Yoshikawa, Eiichi Hisada and Toru Fujii and 115,110/1974 laid open on Nov. 2, 1974 and naming as inventors Takayuki Yoshikawa and Eiichi Hisada, both also naming as applicant NGK Spark Plug Co., Ltd. In these Japanese specifications, a honeycomb body of carbon and/or glassy carbon is produced by mixing charcoal powder, coal powder, wood powder, coke powder, thermosetting resinous powder, or chopped, short natural or artificial fibers with, as a binder, an adhesive such as phenol formaldehyde resin, CMC, dextrin or the like and, as a solvent, water, methanol, toluene or the like, extruding the mixture into a honeycomb structure and firing the extrudate in a non-oxidizing atmosphere at 500°–1,000° C. However, the processing conditions of each step of the production methods disclosed in the Japanese specifications are not suitable to obtain excellent resistance to heat and thermal impact as well as outstanding physical strength. Unless suitable reaction conditions are selected properly, these prior art methods seem to be incapable of providing any product whose quality is good enough to employ it for contemplated purposes.

SUMMARY OF THE INVENTION

An object of this invention is to provide an activated carbonaceous honeycomb body excellent in refractoriness, thermal shock proofness, strength and chemical stability and satisfactorily usable for application as a catalyst support, adsorbent, or the like as well as a production method of the same.

In one aspect embodying the aforementioned object of this invention, there is provided a method for producing an activated carbonaceous honeycomb body which comprises: extruding a mixed and kneaded mass containing a thermosetting resin at an extrusion pressure of 90 kg/cm$^2$ or higher into a honeycomb structure to obtain a green honeycomb body; after drying and solidifying the green honeycomb body, preheating the thus-dried and solidified green honeycomb body in a non-oxidizing atmosphere to a temperature in the range of from 500° to 1,100° C. and holding it within the preheating temperature range until the hydrogen content of the resulting C-matrix thereof has been lowered to 2% or less; and heating the thus-preheated honeycomb body in an activating atmosphere to a temperature in the range of 600° to 1,000° C. and holding the same within the heating temperature range until the ratio of the total thickness of resulting activated carbon layers to that of the remaining glassy carbon layer in the thickness direction of each wall of the honeycomb body has reached a value not greater than 30.

Other embodiments, objects, features and advantages of this invention will become apparent from the following description taken in conjunction of the accompanying drawings.

DETAILED DESCRIPTION OF THE PREFERRED EMBODIMENTS

Figure 1:
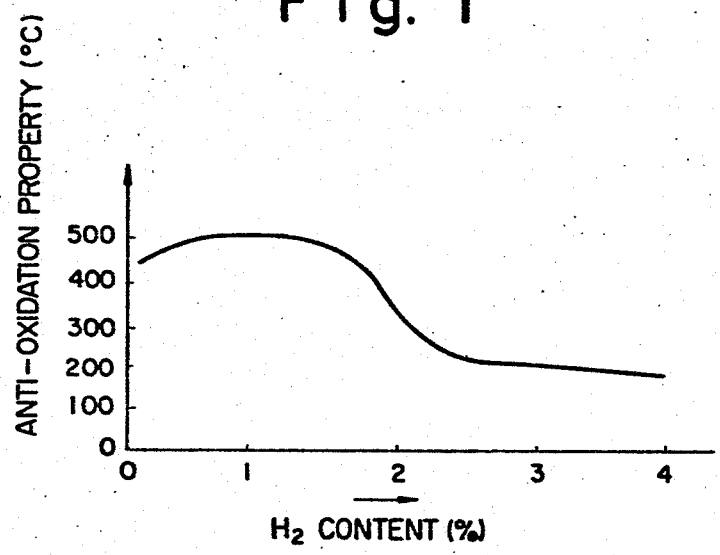
FIG. 1 is a graph showing the relationship between the hydrogen content of a formed body and the anti-oxidation property thereof.
Figure 2:
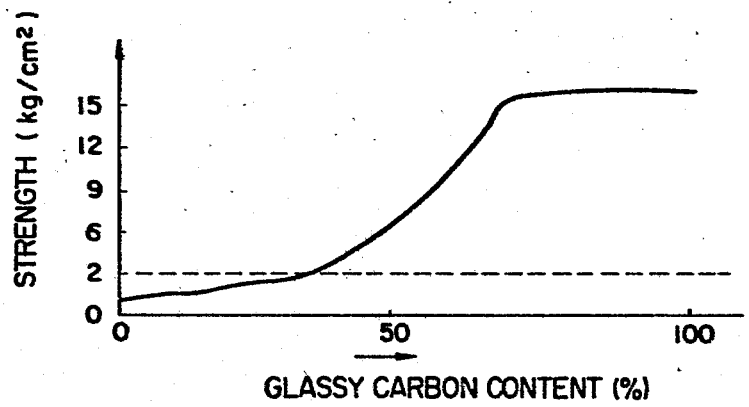
FIG. 2 is a graph showing the relationship between the glassy carbonization percentage of a formed body and the physical strength thereof.

As thermosetting resins usable as raw materials for honeycomb bodies according to this invention, there may be mentioned phenol resins, furan resins, xyleneformaldehyde resins, melamine resins, aniline resins, etc.

The thermosetting resins may be used in the form of either powder or chopped fibers. However, the shape and size of a thermosetting resin and the proportions of certain additives, which will hereinlater to described, must be suitably adjusted in relation to the type of the raw material so that the linear extrusion velocity of a resulting mixed and kneaded mass reaches at least 5 mm/sec in an extrusion step which will also be described hereinlater.

Upon mixed and kneaded the aforementioned thermosetting resin, proper amounts of a solvent, binder and extrusion aid are generally added. Water may be used as the solvent whereas, as the binder, there may be employed a water-soluble thermosetting resinous adhesive such as a phenol or furan resin adhesive. Of course, two or more of such adhesives may be used in combination. Besides these additives, it is preferred to add as an extrusion aid either one of MC (methyl cellulose), CMC (carboxy methyl cellulose), CMS (carboxy methyl starch), HEC (hydroxy ethyl cellulose), HPC (hydroxy propyl cellulose) and the like in order to improve the extrusion formability of the mixed and kneaded mass. Although the binder may be added in any reasonable proportion, it is preferable to limit its content to not higher than 35% by weight of the total weight of the mixed and kneaded mass on dry basis in view of the specific area and total volume of pores of the honeycomb body to be produced after its carbonization and activation. The mixing and kneading, in other words, tempering of these raw materials is not limited to any specific one and any known machine and equipment may be used for the purpose. Where an extruder equipped with an auger is employed upon forming a honeycomb body through extrusion, the auger may be used to mix and knead the raw materials.

It is preferable to allow the mixed and kneaded mass to stand for at least 5 hours at room temperature prior to subjecting the same to an extrusion forming. This bench time of at least 5 hours permits the raw materials in the mixed and kneaded mass to get intimate with one another, thereby improving the extrusion formability of the mixed and kneaded mass.

To form the mixed and kneaded material through extrusion, the above-described extruder equipped with an auger, for example, a pug mill-equipped extruder or a plunger-type extruder may be used and the mixed and kneaded mass is extruded into a honeycomb structure. The present inventors carried out a study on the forming conditions for these extruders. The configurations and dimensions of the cells of a honeycomb body were completed precisely as designed where the pressure exerted onto the inner wall of the extrusion die and the linear velocity of the mixed and kneaded mass passing through the extrusion die were set respectively at 90 kg/cm$^2$ or higher and 5 mm/sec or faster. Where the above conditions were not met, the productivity of honeycomb bodies was deteriorated and, at the same time, cohered or discontinuous cell walls were resulted, whereby adversely affecting on the production yield of the honeycomb bodies.

A green honeycomb body extrusion formed as described above is then dried in accordance with a routine method. Here, it is preferable to cause warm air of 100° C. or lower to flow through each cell of the green honeycomb body to remove water contained therein and, subsequently, to subject the thus-dried green honeycomb body to a solidification treatment within a temperature range of from 50° to 160° C. By such a drying and solidifying step, the chance of cracking may be minimized.

Thereafter, the thus-dried and solidified green honeycomb body is subjected to a carbonization treatment, in which the honeycomb body is heated to a temperature in the range of from 500° to 1,100° C. in a non-oxidizing atmosphere and at a heating speed of 30° C./hr. A heating rate faster than 30° C./hr is not desirous as the honeycomb body would become more susceptible to cracking. On the other hand, a carbonizing temperature lower than 500° C. would result in insufficient carbonization whereas a carbonizing temperature higher than 1,100° C. would not permit to bring about the effect of the subsequent step, i.e., the activation treatment sufficiently. After raising the temperature of the honeycomb body to the above-described temperature, the honeycomb body is held at the same temperature for a predetermined period of time in order to convert its carbon to glassy carbon. The retention time period is basically determined in such a manner that the hydrogen content in the C-matrix of the resulting honeycomb body becomes 2% or less (exclusive of those attached). Each hydrogen atom in the C-matrix is normally present in the form of a C-H bond and pertains a very close relationship to the thermal and chemical stability of the glassy carbon matrix. Namely, as illustrated in FIG. 1, a honeycomb body cannot withstand temperatures in the order of about 200° C. where the hydrogen content in its C-matrix is higher than 2% while, by limiting the hydrogen content not higher than 2%, the heat resistance of the honeycomb body can be considerably improved to temperatures as high as 350°–500° C. Its chemical stability such as the resistance to alkaline substances can also be improved, similar to the refractoriness, by making the hydrogen content below 2%.

The hydrogen content in the C-matrix may be determined through the extraction analysis. It will be determined in this specification in terms of the extraction analytical value of hydrogen to be obtained by heating each C-matrix at temperatures of 2,000° C. or higher and for 60 seconds in a carbon crucible.

The hydrogen content in each C-matrix is also connected with the conversion ratio of the C-matrix to glassy carbon. As the hydrogen content decreases, the conversion ratio into glassy carbon tends to increase although the degree of increment varies with raw material. Accordingly, by predetermined the retention time period at high temperatures so as to lower the hydrogen content in the C-matrix in a honeycomb body to 2% or lower and actually holding the honeycomb body at the same temperature for the predetermined time period, the carbon can be sufficiently converted to glassy carbon and, in addition to imparting refractoriness to the honeycomb body, its strength and thermal shock proofness can be improved. To increase the strength of a honeycomb body to a sufficient degree, it is necessary to control the abovementioned retention time at high temperatures so as to achieve a conversion ratio into glassy carbon of at least 90%. Therefore, it is necessary to control the retention time period of a honeycomb body at high temperatures in view of these factors for providing the honeycomb body with more preferable quality.

Where the conversion ratio into glassy carbon is 90% or higher, the strength of the resulting honeycomb body exceeds considerably the strength of 3 kg/cm$^2$ which a catalyst support is required to have and, it would also be used satisfactorily in a field where vibrations and pressures are exerted onto the honeycomb body.

To contemplate a further improvement to the refractoriness, carbon powder or metal carbides such as SiC, TiC and $W_2C$ may be incorporated in the tempered mass of the raw materials.

The thus-obtained honeycomb body of glass carbon is then subjected to an activation treatment to impart activity to it. Since this activation treatment makes use of an atmosphere different from that employed in the preceding carbonization treatment, the honeycomb body has to be cooled down once prior to proceeding with the activation treatment. In order to avoid cracking due to the cooling, the cooling rate is limited below 50° C./hr to a temperature 100° C. below the retention temperature but it may be made faster up to 100° C./hr thereafter. The honeycomb body thus withdrawn from the kiln for the carbonization treatment is again heated to a temperature in the range of from 600° to 1,000° C. in an oxidizing atmosphere such as steam, carbon dioxide, combustion gas, air, oxygen or the like. By holding the honeycomb body at the same temperature in a certain period of time, the glassy carbon or the body is gradually activated by the atmosphere gas and converted to activated carbon. Because the strength of the honeycomb body is considerably lowered as the activation proceeds too much, the retention time period of the honeycomb body in the oxidizing atmosphere is adjusted so as to limit the ratio (A/B) of the total thickness of activated layers to that of the remaining glassy carbon layer in the thickness direction of each wall of the honeycomb body to not greater than 30. An activated carbonaceous honeycomb body obtained as above has a specific surface area of about 300–2000 $m^2/g$ and will exhibit excellent effects as a catalyst support, filter or adsorbent.

The activated carbonaceous honeycomb body may be employed more suitably in the aforementioned application fields if the proportion of an extrusion aid to be incorporated in the tempered mass is adjusted to obtain a value of at least 0.2 cc/g as the porosity of each glassy carbon layer of the honeycomb body. The term "porosity" as used herein is expressed by a measurement value which is obtained by evacuating completely any gaseous substances present in fine pores and voids of a sintered or fired product, immersing the thus-evacuated product in pure mercury and hermetically sealing the mercury together with the product, applying a pressure to the mercury to force it to penetrate under pressure into the fine pores and voids of the product, and measuring a reduction in the apparent volume of the mercury.

Various embodiments of this invention are further illustrated in the following example, in which all parts are by weight unless otherwise specified.

EXAMPLE

A novolak-type phenol resin powder, water-soluble resol-type phenol resin binder, CMC and water were mixed and kneaded in advance and allowed to stand for 12 hours. Then, the mixed and kneaded mass was formed through extrusion into a honeycomb structure at a pressure of 130 kg/$cm^2$. The thus-obtained green honeycomb body was charged in a drier maintained at 50° C. and subjected to a solidification treatment by heating the green honeycomb body to 140 at a heating rate of 3° C./hr and holding it for 12 hours while circulating air through the drier at a flow rate of 0.1 m/sec or so.

The thus-solidified honeycomb body was placed in a muffle kiln and the air within the muffle kiln was substituted by argon gas. Then, the honeycomb body was heated to 750° C. at a heating rate of 15° C./hr and held for 8 hours. It was then allowed to cool down gradually in the kiln. The carbonized product withdrawn from the kiln was then charged in an activation kiln and subjected to an activation treatment in an $N_2$ gas atmosphere of $P_{H2O}=0.3$ or 0.4 atom and under the conditions described in Table 1.

Although the hydrogen content and activation ratio (A/B) are different from one batch to another batch depending on the principal raw material employed and composition, excellent strength and thermal impact proofness were obtained from each of the batches as both hydrogen content and activation ratio (A/B) fell within the conditions selected in the present invention.

As mentioned above, the parts of raw materials described in Table 1 are expressed by weight. By the term "A-axis" in the compression strength at normal temperature is meant the axial direction of the honeycomb body whereas both "B-axis" and "C-axis" extend in directions perpendicular to the A-axis. Particularly, the "B-axis" and "C-axis" mean that honeycomb body was compressed respectively in a direction along a wall, which crosses with another wall at a right angle, and in a direction aslant to the wall.

TABLE 1

| | | 1 | 2 | 3 | 4 | 5 |
|---|---|---|---|---|---|---|
| Phenol resin powder (−200 mesh) | | 100 | 50 | — | 30 | — |
| Half-cured phenol resin powder (−200 mesh) | | — | 50 | 50 | 30 | 20 |
| SiC (−325 mesh) | | — | — | — | 10 | — |
| TiC (−500 mesh) | | — | — | — | — | 10 |
| Carbon powder (−200 mesh) | | — | — | 50 | 30 | 70 |
| CMC | | 2 | 2 | 2 | 2 | 2 |
| Water | | 10 | 5 | 5 | 5 | 5 |
| Water-soluble phenol resin binder | | 30 | 33 | 35 | 31 | 38 |
| Extrusion pressure (kg/$cm^2$) | | 135 | 115 | 105 | 120 | 100 |
| Firing temperature (°C., Ar-atmosphere) | | 750 | 750 | 750 | 750 | 750 |
| Activation treatment | temperature (°C.) | 950 | 950 | 900 | 900 | 900 |
| | time period (hr) | 5 | 5 | 3 | 3 | 3 |
| | $P_{H2O}$ | 0.3 | 0.3 | 0.4 | 0.4 | 0.3 |
| Compression strength under normal temperature (kg/$cm^2$) | A-axis | 825 | 800 | 820 | 700 | 650 |
| | B-axis | 280 | 140 | 160 | 80 | 90 |
| | C-axis | 20 | 25 | 27 | 12 | 18 |

TABLE 1-continued

|  | 1 | 2 | 3 | 4 | 5 |
|---|---|---|---|---|---|
| Thermal shock proofness | ≧900 | ≧750 | ≧600 | ≧500 | ≧400 |
| Specific surface area (m²/g) | 1050 | 1120 | 980 | 990 | 920 |
| Conversion ratio into activated carbon (A/B) (%) | 18 | 14 | 23 | 20 | 29 |

This invention is constituted as has been described above and now provides activated carbonaceous honeycomb bodies satisfactorily employable as catalyst supports, adsorbents, filters, etc.

Having now fully described the invention, it will be apparent to one or ordinary skill in the art that many changes and modifications can be made thereto without departing from the spirit or scope of the invention as set forth herein.

What is claimed as new and desired to be secured by Letters Patent by the United States is:

1. A method for producing an activated carbonaceous honeycomb body which comprises:

extruding a mixed and kneaded mass containing a thermosetting resin, a water-soluble thermosetting resinous adhesive as a binder and an extrusion aid at an extrusion pressure of 90 kg/cm² or higher into a honeycomb structure to obtain a green honeycomb body, the composition of the mixed and kneaded mass having been adjusted so as to produce a linear extrusion velocity of at least 5 mm/sec;

after drying and solidifying the green honeycomb body, preheating the thus-dried and solidified green honeycomb body in a non-oxidizing atmosphere at a heating rate of 30° C./hr or lower to a temperature in the range of from 500° to 1,100° C. and holding it within the preheating temperature range until the hydrogen content of the resulting C-matrix thereof has been lowered to 2% or less; and heating the thus-preheated honeycomb body in an activating atmosphere to a temperature in the range of from 600° to 1,000° C. and holding the same within the heating temperature range until the ratio of the total thickness of resulting activated carbon layers to that of the remaining glassy carbon layer in the thickness direction of each wall of the honeycomb body has reached a value not greater than 30.

2. The method as claimed in claim 1, wherein the thus-dried and solidified green honeycomb body is heated until at least 90% of the carbon in the resulting C-matrix has been converted into glassy carbon.

3. The method as claimed in claim 1, wherein the proportion of the extrusion aid has been adjusted so as to render the porosity of each glassy carbon layer in the activated carbonaceous honeycomb body be at least 0.2 cc/g.

4. A method for producing an activated carbonaceous honeycomb body which comprises:

extruding a mixed and kneaded mass containing a phenol resin into a honeycomb structure at an extrusion pressure of 90 kg/cm² or higher and at a linear extrusion velocity of 5 mm/sec or faster to obtain a green honeycomb body;

allowing the green honeycomb body to stand for at least 5 hours;

after drying and solidifying the green honeycomb body, preheating the thus-dried and solidified green honeycomb body in a non-oxidizing atmosphere to a temperature in the range of from 500° to 1,100° C. and holding it within the preheating temperature range until the hydrogen content of the resulting C-matrix thereof has been lowered to 2% or less;

cooling the thus-preheated honeycomb body at a cooling rate of 50° C./hr or lower to a temperature 100° C. below the final holding temperature and then at a cooling rate of 100° C./hr or lower; and heating again the thus-cooled honeycomb body in an activating atmosphere to a temperature in the range of from 600° to 1,000° C. and holding the same within the heating temperature range until the ratio of the total thickness of resulting activated carbon layers to that of the remaining glassy carbon layer in the thickness direction of each wall of the honeycomb body has reached a value not greater than 30.

5. An activated carbonaceous honeycomb body made of glassy carbon and activated carbon, wherein the ratio of the total thickness of activated carbon layers to that of a glassy carbon layer in the thickness direction of each wall of the honeycomb body is 30 or less, the specific surface area of each activated carbon layer ranges from 300 to 2,000 m²/g, the porosity of the glassy carbon layer is at least 0.2 cc/g and the hydrogen content in the C-matrix of the honeycomb body is not greater than 2%.

6. The activated carbonaceous honeycomb body as claimed in claim 5, wherein said body has been obtained by extruding a mixed and kneaded mass containing a thermosetting resin at an extrusion pressure of 90 kg/cm² or higher into a honeycomb structure to form a green honeycomb body, preheating the green honeycomb body in a non-oxidizing atmosphere to a temperature between 500° and 1,100° C. and holding it within the preheating temperature range, and thereafter heating the thus-preheated honeycomb body in an activating atmosphere to a temperature between 600° and 1,000° C. and holding the same within the heating temperature range.

* * * * *